E. D. PUGH.
Improvement in Insect-Destroyers.
No. 130,390.            Patented Aug. 13, 1872.
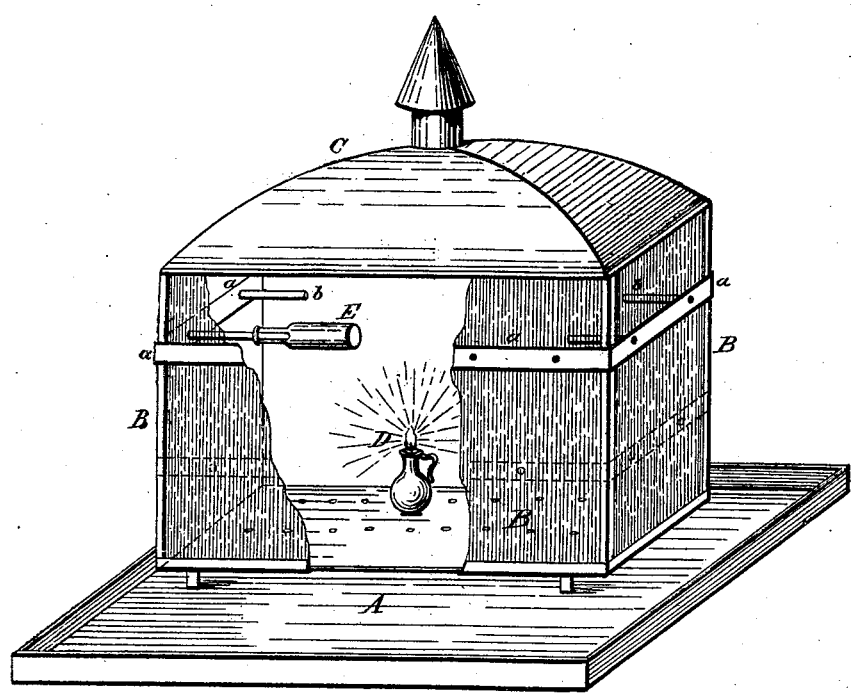
Witnesses:
N. Gipp
M. E. Orwig
Inventor:
Edward D. Pugh,

UNITED STATES PATENT OFFICE.

EDWARD D. PUGH, OF FORT PLAIN, IOWA.

IMPROVEMENT IN INSECT-DESTROYERS.

Specification forming part of Letters Patent No. 130,390, dated August 13, 1872.

SPECIFICATION.

Specification describing certain Improvements in Insect-Traps, invented by EDWARD D. PUGH, of Fort Plain, in the county of Warren and State of Iowa.

My invention is an insect-trap specially designed to protect bees and fruit trees from the ravages of the moth and other insects. It consists in a glass and sheet-metal case with a movable cover and side apertures, and tubes, and bottles, and a lamp, and a pan and bait, combined and operated as hereinafter fully set forth.

My drawing is a miniature perspective view with part of the front of the case removed, and illustrates the manner of construction and operation of my trap.

A A represent a shallow sheet-metal pan, which may vary in form and size to correspond with the form and size of the case. It must, however, always be larger than the case and extend outside and beyond the case which is placed therein. B B B is the glass and sheet-metal case. It may vary in form and size, as desired. The bottom is sheet metal, and has a number of perforations or holes punched in to ventilate. It has short feet attached on the under side and near the corners to keep it above the liquid placed in the pan. The frame is made of sheet metal and in the form of a sash, so as readily to receive and hold the panes of glass. $a\ a$ represents part of the frame, near the middle of its elevation and extending entirely around the case, with tubes attached on the inside and apertures communicating with the outside. $b\ b$ are the tubes attached on the inside. These are usually about one-half inch in diameter, made of metal, and may vary in diameter and length to suit the bottles to be placed upon them. The number of tubes and bottles used may vary from one to twenty or more. The dotted lines indicate how a second tier of tubes and bottles may be introduced. C is a sheet-metal cover corresponding in form and size with the case, and can be readily lifted off and on. It has a chimney or opening in the top and center to allow the smoke and heat of the lamp to escape. It is held in place by means of hooks or other suitable catches. The top may be fixed and stationary, and one of the sides of the case, or a section thereof, may be hinged so as to admit the bottles and lamp; but, for economy in construction and convenience in use, it is preferable to make the top in the form of a movable or hinged cover. D is a portable lamp, that is lighted and placed in the case to operate the trap. Any suitable form of lamp or candlestick may be used to provide the light that is required. E represents a long-necked common bottle placed on one of the tubes $b$ on the inside of the case. These bottles may vary in form and size and number, as desired.

To operate my trap, put honey and wax or other suitable bait into the bottles and then place the bottles on the tubes $b$ on the inside of the case. Set the case in the center of the pan A A and partly fill the pan with soap-suds or some other liquid that will destroy insects that fall into it. Place the lighted lamp or its equivalent in the case and set the trap near the bee-hives, in the orchard, or wherever desired. The moth and other insects will be attracted by the light and fly against the glass. Many will fall into the liquid in the pan and perish. Those that alight safely on the sides of the case will be attracted by the bait in the bottles and will pass through the apertures and tubes and into the bottles, where they will remain until removed and destroyed. An apiary and orchard may thus be easily protected from the ravages of the moth and other destructive insects.

I am aware that a light for attracting insects, and a pan of fluid for destroying them, have been used. I claim, however, that my apparatus, with tubes and bottles attached, affords an attractive harbor for insects and a new means of extermination. The insects that escape the pan of fluid enter the bottles to feed and to breed, and, together with the innumerable eggs they may deposit in the night, are trapped in these attractive places of concealment, in which they can be readily destroyed.

Claim.

I claim as my invention—

An insect-trap, composed of the plan A A, the metal and glass case B B B, the movable cover C, the sash $a\ a$ with apertures and tubes $b\ b$ attached, bait-bottles E, and light D, all made, combined, and operated substantially as described, and for the purposes specified.

EDWARD D. PUGH.

Witnesses:
MARSHALL BANKS,
GEORGE COLLINGS.